UNITED STATES PATENT OFFICE.

TEDROW S. KEYSER, OF CLEVELAND, OHIO.

AGAR-AGAR BISCUIT AND METHOD OF MAKING THE SAME.

1,201,742. Specification of Letters Patent. Patented Oct. 17, 1916.

No Drawing. Application filed July 17, 1916. Serial No. 109,788.

*To all whom it may concern:*

Be it known that I, TEDROW S. KEYSER, a citizen of the United States, residing at Cleveland, in the county of Cuyahoga and State of Ohio, have invented a new and useful Agar-Agar Biscuit and Method of Making the Same, of which the following is a specification.

The invention relates to the use of agar-agar as a laxative or mild cathartic; and the object of the invention is to make crackers, wafers, cookies and other forms of bread or biscuit with agar-agar therein, without breaking down its physical structure, or gelatinizing the same.

Agar-agar, sometimes known as Ceylon moss, Bengal isinglass or Japanese gelatin, consists of dry seaweed of several species, and is much used in the East for soups and jellies. It is supplied commercially in dry, transparent pieces which are reduced to fibrous cellular flakes or a coarse powder for medicinal use. It has the natural property of absorbing water and retaining it, and in medicine, the additional property of resisting the action of the intestinal bacteria and of the digestive enzymes. Its chief therapeutic use is in the treatment of chronic constipation.

In its commercial form of dry flakes or coarse powder, agar-agar acts as a mechanical stimulant to the intestine, and passes into the same without being materially altered by the digestive process, and remains therein as undigested residue until ejected. It has the property of absorbing water to approximately eight times its original volume. The agar-agar, however, only retains these properties when it is eaten in its original, commercial, or natural dried fibrous cellular form. If it is dissolved or gelatinized, the cellular sponge-like structure is broken down and its power to absorb moisture is consequently destroyed.

When agar-agar enters the intestines in its natural or original cellular form, the increase in its bulk by the absorption of moisture increases the volume of and softens the feces, thereby stimulating the peristaltic motion of the bowels and inducing comfortable ejection. This action is largely, if not entirely, of a mechanical nature, and is contingent upon the power of the agar-agar in its original commercial form to absorb water like a sponge and thereby to expand greatly in volume. When, however, agar-agar is dissolved or converted into gelatin, as by soaking and cooking in water or with other food in the ordinary manner, its physical structure is completely changed, and its fibrous and cellular form and the therapeutic properties arising therefrom, are completely destroyed. Furthermore, it is somewhat distasteful and very difficult to masticate and swallow the fibrous flakes or coarse powder of agar-agar in its natural or commercial form. These difficulties are overcome and the agar-agar is combined in a convenient and edible form, without destroying its therapeutic properties, by mixing it in a biscuit dough after substantially all of the moisture contained in the batter or sponge has been absorbed by the addition of flour and other dry ingredients. Such a dough is generally known as dry dough, as distinguished from the soft dough known in the culinary art. When agar-agar is thus incorporated in a dry dough and quickly baked into crackers, wafers, cookies or other form of biscuit, its fibrous, cellular structure is not destroyed, but is maintained, so that the biscuit can be eaten and the agar-agar introduced into the intestinal tract in the same form as if agar-agar alone had been eaten. As an example of thus incorporating agar-agar into a dough mixture, soda crackers containing the same, can be made as follows:—Mix together fifty pounds of flour and one-fourth pound of yeast with sufficient water to make a sponge. Let the sponge rise over night. In the morning, mix into the sponge about one hundred and twenty-five pounds of flour, twenty pounds of shortening, four pounds of salt, and three-fourths of a pound of bicarbonate of soda. When the dough is smooth, mix into it fifteen pounds of commercial agar-agar. Let the dough rise for about an hour, then roll or cut into shape and bake in a quick oven. The brittleness of such a cracker, makes the presence of the agar-agar difficult if not impossible to detect during the process of mastication, and the cracker is just as palatable as a soda cracker made without agar-agar; and this is true of any form of cracker, wafer, cookie or other biscuit in which agar-agar is incorporated in substantially the same manner. It is not essential to prepare the dough by a yeast process, nor is it necessary to leaven the dough at all, but the use of a yeast leavening process for making the biscuit is preferred for practical purposes.

I claim:

1. A biscuit or the like containing natural dried agar-agar.

2. A biscuit or the like containing fibrous agar-agar.

3. A biscuit or the like containing cellular agar-agar.

4. A biscuit or the like containing non-gelatinized agar-agar.

5. Making biscuit or the like by preparing dry dough and adding natural dried agar-agar thereto.

6. Making biscuit or the like by preparing dry dough and adding fibrous agar-agar thereto.

7. Making biscuit or the like by preparing dry dough and adding cellular agar-agar thereto.

8. Making biscuit or the like by preparing dry dough and adding non-gelatinized agar-agar thereto.

9. Making biscuit or the like by preparing a sponge, then adding flour to absorb the free moisture and mixing natural dried agar-agar therewith.

10. Making biscuit or the like by preparing a sponge, then adding flour to absorb the free moisture and mixing fibrous agar-agar therewith.

11. Making biscuit or the like by preparing a sponge, then adding flour to absorb the free moisture and mixing cellular agar-agar therewith.

12. Making biscuit or the like by preparing a sponge, then adding flour to absorb the free moisture and mixing non-gelatinized agar-agar therewith.

13. Making biscuit or the like by preparing dry dough, adding natural dried agar-agar thereto and baking in a quick oven.

14. Making biscuit or the like by preparing dry dough, adding fibrous agar-agar thereto and baking in a quick oven.

15. Making biscuit or the like by preparing dry dough, adding cellular agar-agar thereto and baking in a quick oven.

16. Making biscuit or the like, by preparing dry dough, adding non-gelatinized agar-agar thereto and baking in a quick oven.

TEDROW S. KEYSER.